United States Patent
Choi et al.

(10) Patent No.: US 10,897,377 B2
(45) Date of Patent: Jan. 19, 2021

(54) SYSTEM FOR NETWORK USING BUS PROTOCOL

(71) Applicant: Daegu Gyeongbuk Institute of Science and Technology, Daegu (KR)

(72) Inventors: Ji Woong Choi, Daegu (KR); Sung Min Han, Daejeon (KR); Kyu Min Kim, Daegu (KR); Eun Min Choi, Changwon-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 16/535,609

(22) Filed: Aug. 8, 2019

(65) Prior Publication Data
US 2020/0059379 A1    Feb. 20, 2020

(30) Foreign Application Priority Data

Aug. 8, 2018   (KR) .......................... 10-2018-0092201

(51) Int. Cl.
*H04L 12/403* (2006.01)
*H04L 12/40* (2006.01)
*H04L 12/64* (2006.01)

(52) U.S. Cl.
CPC ...... *H04L 12/403* (2013.01); *H04L 12/40019* (2013.01); *H04L 12/6418* (2013.01); *H04L 2012/6435* (2013.01); *H04L 2012/6456* (2013.01)

(58) Field of Classification Search
CPC ............. H04L 12/403; H04L 12/40019; H04L 12/6418
USPC ......................................................... 710/100
See application file for complete search history.

(56) References Cited

U.S. PATENT DOCUMENTS

| | | | | |
|---|---|---|---|---|
| 3,855,556 A | * | 12/1974 | Hartmann | H03H 9/42 333/193 |
| 4,144,495 A | * | 3/1979 | Metzger | H04B 7/2045 342/353 |
| 4,417,245 A | * | 11/1983 | Melas | H04Q 3/68 340/2.22 |
| 4,605,928 A | * | 8/1986 | Georgiou | H04Q 3/521 340/2.23 |
| 4,763,089 A | * | 8/1988 | Pon | H01P 1/2135 333/103 |
| 4,858,225 A | * | 8/1989 | deSantis | H04B 7/2045 370/323 |

(Continued)

FOREIGN PATENT DOCUMENTS

KR   10-1999-0077415 A   10/1999
KR   10-0507637 B1       8/2005

(Continued)

OTHER PUBLICATIONS

Korean Office Action for Patent Application No. KR 10-2018-0092201 dated Jul. 3, 2019; 5 pages.

*Primary Examiner* — Paul R. Myers
(74) *Attorney, Agent, or Firm* — Hauptman Ham, LLP (57) ABSTRACT

Provided is a bus network system including: a master node switch; and a plurality of slave node switches, wherein each of the plurality of slave node switches includes at least one band limit switch configured to transmit signals in a given band, and each of the plurality of slave node switches is configured to be physically on/off controlled.

9 Claims, 5 Drawing Sheets

(56) References Cited

U.S. PATENT DOCUMENTS

| | | | | |
|---|---|---|---|---|
| 4,905,239 | A | * | 2/1990 | Lockwood .............. H01P 1/213 333/110 |
| 4,970,479 | A | * | 11/1990 | Landt .................... H01P 1/2053 333/101 |
| 5,287,543 | A | * | 2/1994 | Wolkstein ............ H04B 7/2045 330/124 R |
| 5,327,538 | A | * | 7/1994 | Hamaguchi ......... G06F 13/1652 710/107 |
| 5,428,814 | A | * | 6/1995 | Mort .................... H04B 7/2046 333/101 |
| 5,636,361 | A | * | 6/1997 | Ingerman ............ G06F 13/4022 711/147 |
| 5,796,964 | A | * | 8/1998 | Bass ....................... G06F 13/36 710/305 |
| 5,822,312 | A | * | 10/1998 | Peach .................. H04B 7/2041 370/323 |
| 5,956,620 | A | * | 9/1999 | Lazaris-Brunner .......................... H04B 7/18515 455/12.1 |
| 6,026,092 | A | * | 2/2000 | Abu-Amara ....... H04B 7/18584 370/388 |
| 6,130,590 | A | * | 10/2000 | Kolsrud .................... H03H 9/60 333/174 |
| 6,141,349 | A |  | 10/2000 | Ikeda et al. |
| 6,157,811 | A | * | 12/2000 | Dent ...................... H01Q 1/288 455/12.1 |
| 6,317,583 | B1 | * | 11/2001 | Wolcott ............. H04B 7/18539 370/318 |
| 6,434,612 | B1 | * | 8/2002 | Hughes ................ H04L 49/255 709/223 |
| 6,618,777 | B1 | * | 9/2003 | Greenfield .......... G06F 13/1605 710/120 |
| 6,670,882 | B1 | * | 12/2003 | Bachar .................. H04L 12/403 340/2.81 |
| 6,763,030 | B1 | * | 7/2004 | Regev ................... H04L 49/352 370/369 |
| 6,946,948 | B2 | * | 9/2005 | McCormack ....... G06F 13/4022 257/E23.171 |
| 7,814,527 | B2 |  | 10/2010 | Bertin et al. |
| 8,248,977 | B2 | * | 8/2012 | Harverson ......... H04B 7/18515 370/310.2 |
| 8,422,977 | B2 | * | 4/2013 | Robert ................ H03H 7/0153 455/323 |
| 9,330,041 | B1 |  | 5/2016 | Stark |
| 9,436,642 | B2 | * | 9/2016 | Yamaguchi ......... H04L 12/4013 |
| 9,490,852 | B2 |  | 11/2016 | Kehrer |
| 10,565,346 | B1 | * | 2/2020 | Suthar ................... G06F 30/392 |
| 2003/0169734 | A1 | * | 9/2003 | Lu ........................ H04L 49/351 370/386 |
| 2006/0221972 | A1 | * | 10/2006 | Bhargava ............. H04L 49/203 370/392 |
| 2014/0269738 | A1 | * | 9/2014 | Pierson .................. H04L 49/35 370/400 |
| 2014/0324367 | A1 | * | 10/2014 | Garvey, III ............ G01D 18/00 702/56 |
| 2017/0302302 | A1 | * | 10/2017 | Adamski ................ H04B 1/18 |

FOREIGN PATENT DOCUMENTS

| | | |
|---|---|---|
| KR | 10-2006-0108216 A | 10/2006 |
| KR | 10-0935325 B1 | 1/2010 |
| KR | 10-1713410 B1 | 3/2017 |

* cited by examiner

SYSTEM FOR NETWORK USING BUS PROTOCOL

CROSS-REFERENCE TO RELATED APPLICATION(S)

This application claims priority to Korean Patent Application No. 10-2018-0092201, filed on Aug. 8, 2018 in the Korean Intellectual Property Office, the entirety of which is hereby incorporated by reference herein.

BACKGROUND

1. Field

One or more embodiments relate to a bus network system using a physical switch.

2. Description of Related Art

In electrical or electronic systems, various individual system modules (such as electronic/electrical assemblies or electronic/electrical components), various semiconductor components (such as integrated circuits), and various sub-components provided in the same component, integrated circuit, or the like communicate with each other via a transmission medium such as a bus system.

Such a bus system may include one or more transmission lines. Some modules/components/elements, particularly, two or more modules/components/elements of each system may share a communication channel such like bus system.

In the related art, a plurality of bus systems include several sub-systems such as a data bus including one or more data lines, and/or an address bus including one or more address lines, and/or a control bus including one or more control lines.

Other examples of relatively simple bus systems include local interconnect network (LIN) buses each generally including only one transmission line, and controller area network (CAN) buses each generally including two or three lines (for example, CAN_HIGH, CAN_LOW, and optionally CAN_GND (ground)).

According to a CAN protocol, for example, the CAN 2.0 protocol, each data frame transmitted through a CAN bus includes a plurality of predefined fields (for example, as defined in a "base frame format") such as a "start of frame" field, an "ID" field, or a "data length code (DLC)" field, followed by a "data" field (including actual useful data to be transmitted), a "cyclic redundancy checksum (CRC)" field, a "acknowledgement (ACK)" filed, and an "end of frame" field.

In addition, according to the CAN protocol, data contained in frames is transmitted at a predefined data rate, for example, 1 Mbit/s for a high speed bus, and 125 Kbit/s for a low speed bus.

SUMMARY

One or more embodiments disclose reduction of data collisions between networks by physically controlling a connection between nodes of a bus network by using switches.

One or more embodiments disclose a change to the physical structure of a bus network by using band limit switches such that the network traffic may be controlled properly.

Additional aspects will be set forth in part in the description which follows and, in part, will be apparent from the description, or may be learned by practice of the presented embodiments of the disclosure.

According to one or more embodiments, a bus network system includes: a master node switch; and a plurality of slave node switches, wherein each of the plurality of slave node switches includes at least one band limit switch configured to transmit signals in a given band, and each of the plurality of slave node switches is configured to be physically on/off controlled.

The master node switch may selectively physically turn on at least one slave node switch in a given path.

Among the at least one band limit switch included in the turned-on at least one slave node switch, a band limit switch configured to transmit signals in the given band may be selectively turned on.

Each of the plurality of slave node switches may be connected to an input/output port.

According to one or more embodiments, a bus network system includes: a master node switch; and a plurality of slave node switches arranged in N rows and M columns where N and M are respectively natural numbers, wherein each of the plurality of slave node switches includes one or more band limit switches such that each of the plurality of slave node switches is capable of transceiving one or more signals in different bands, and the master node switch controls the plurality of slave node switches and the one or more band limit switches to physically turn on and off the plurality of slave node switches and the one or more band limit switches.

The plurality of slave node switches may be implemented such that a plurality of slave node switches arranged in an arbitrary row of the N rows or an arbitrary column of the M columns may be simultaneously physically turned on.

When at least three slave node switches arranged in an arbitrary row of the N rows or an arbitrary column of the M columns are simultaneously physically turned on, collision therebetween may be prevented by using a bus network protocol.

The master node switch may physically turn on at least one slave node switch according to network traffic from an input/output network connected to the plurality of slave node switches, and may selectively physically turn on the one or more band limit switches included in the turned-on at least one slave node switch based on bandwidth information about the network traffic.

According to one or more embodiments, a bus network system includes: a master node switch; and a plurality of slave node switches, wherein each of the plurality of slave node switches includes at least one sub-switch, and each of the plurality of slave node switches is configured to transceive at least one network traffic stream corresponding to the at least one sub-switch.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, embodiments of the present disclosure will be described with reference to the accompanying drawings so that those skilled in the art may easily implement the idea of the present disclosure. However, the idea of the present disclosure may be implemented in various ways and is not limited to the embodiments described herein. In the drawings, portions not relevant to the present disclosure may be omitted for clarity of illustration, and like reference numerals refer to like elements throughout.

In the present specification, when a portion is referred to as being "connected to" or "coupled to" another portion, the portion may be directly connected to or coupled to the other portion, or may be electrically connected to or coupled to the other portion with another portion therebetween. It will be further understood that the terms "comprises" and/or "comprising" used herein specify the presence of stated features or elements, but do not preclude the presence or addition of one or more other features or elements.

Figure 1:
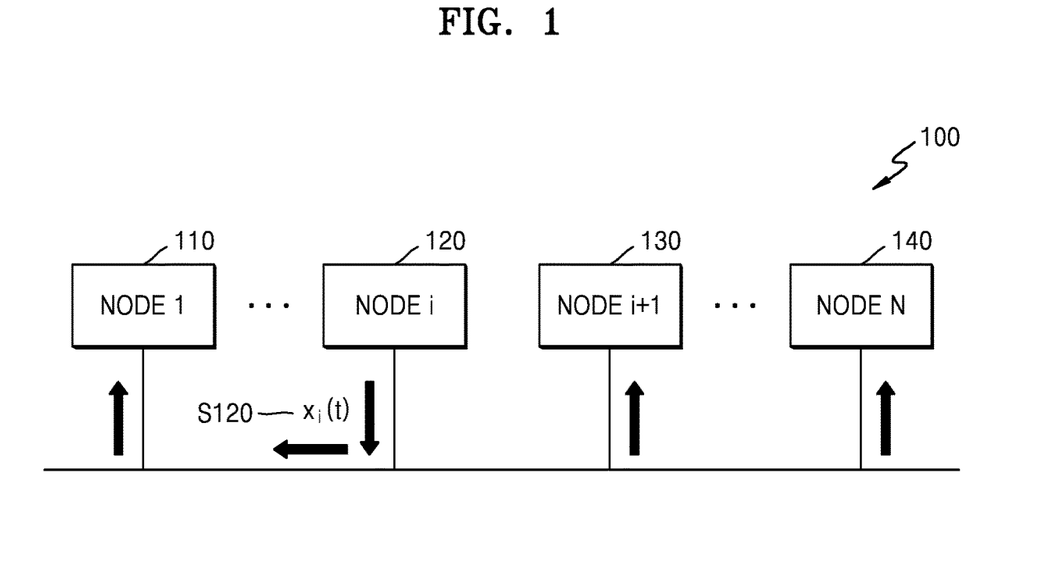
FIG. 1 is a view illustrating an example of a data transmission method in a bus network system.

FIG. 1 is a view illustrating an example of a data transmission method in a bus network system.

The bus network system shown in FIG. 1 includes N nodes 1 110, . . . , i 120, i+1 130, . . . , and N 140. In the bus network system having a bus structure, all the nodes 1 110, . . . , i 120, i+1 130, . . . , and N 140 share a communication channel. Therefore, when the node i 120 transmits data xi(t) S120 by designating the node N 140 as a destination, all nodes 1 110, . . . , i+1 130, . . . , and N 140 may receive the data xi(t) S120 but only the node N 140 which needs the data xi(t) S120 performs data processing while the other nodes 1 110, . . . , i 120, i+1 130, . . . do not perform data processing.

In this case, the node 1 110 and the node i+1 130 may not transceive data until the end of communication between the node i 120 and the node N 140, and thus, after waiting until the communication between the node i 120 and the node N 140 ends, the node 1 110 and the node i+1 130 may sequentially try to communicate, thereby resulting in poor efficiency.

In addition, when the node i 120 and the node N 140 simultaneously transmit different data xi (t) and yi(t), unintended inter-node current may flow because of a voltage difference, and thus nodes and data may be damaged.

Figure 2:
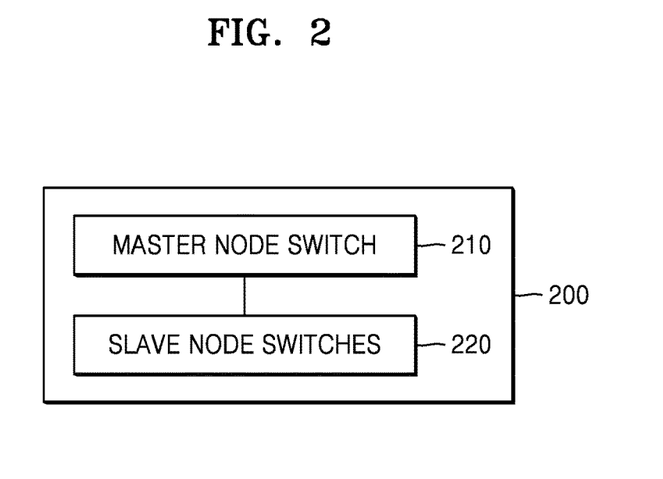
FIGS. 2 and 3 are views illustrating internal structures of bus network systems according to embodiments.
Figure 3:
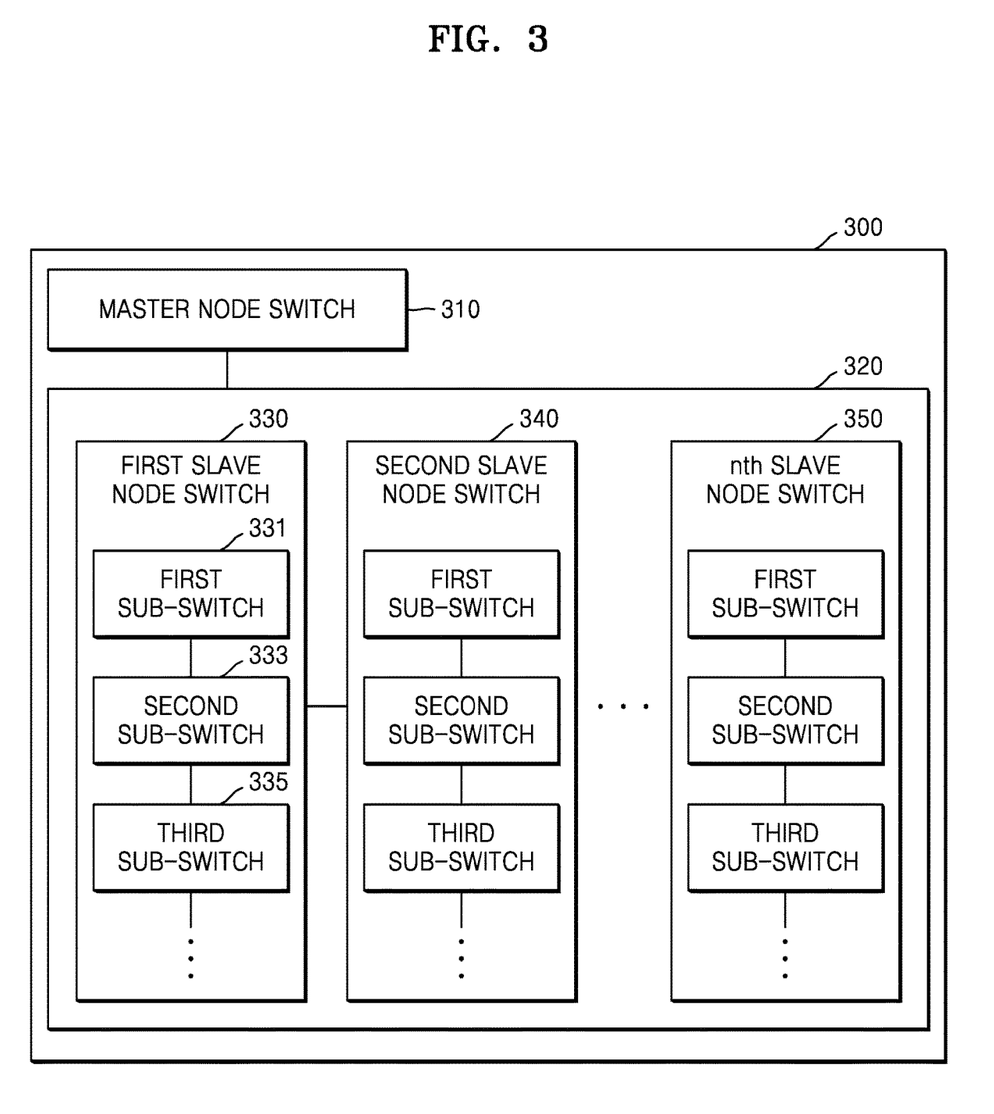

FIGS. 2 and 3 are views illustrating internal structures of bus network systems 200 and 300 according to embodiments.

According to the embodiments, the bus network systems 200 and 300 include: master node switches 210 and 310, and a plurality of slave node switches 220 and 320, wherein each of the master node switches 210 and 310 and the plurality of slave node switches 220 and 320 is implemented using a physical switch. Bus networks each having a single node or a plurality of nodes may be respectively connected to the plurality of slave node switches 220 and 320.

According to other embodiments, the master node switches 210 and 310 and the plurality of slave node switches 220 and 320 may be implemented using physical switches, but may be compatible with a bus network protocol and may have unique bus protocol-based IP addresses.

In embodiments, the bus network systems 200 and 300 may be implemented by connecting nodes through physical switches and controlling the connection to reduce data collisions. Since the bus network systems 200 and 300 use physical switches, routers and data decoding are not required.

In embodiments, the bus network systems 200 and 300 may transceive data using N slave node switches 220 and 320 at the same time, and thus response times and network loads may be reduced.

In embodiments, the master node switches 210 and 310 may know in advance the characteristics of the plurality of slave node switches 220 and 320 of the bus network systems 200 and 300 and may control the plurality of slave node switches 220 and 320 such that the plurality of slave node switches 220 and 320 may be individually turned on and off.

Referring to FIG. 3, the master node switch 310 may also know information about sub-switches 331, 333, 335, . . . included in each of the plurality of slave node switches 320 and may control the sub-switches 331, 333, 335, . . . to individually physically turn the sub-switches 331, 333, 335, . . . on and off.

In this case, the master node switch 310 physically turns on at least one slave node switch 320 according to network traffic from an input/output network connected to the plurality of slave node switches 320, and selects and physically turns on at least one band limit switch included in the turned-on at least one slave node switch 320 based on information about the bandwidth of the network traffic. When a plurality of network traffic streams are introduced into a slave node switch 320, those of ordinary skill in the bus network field may handle the plurality of network traffic streams according to a general bus network protocol.

Referring to FIG. 3, each of a first slave node switch 330, a second slave node switch 340, . . . , and an nth slave node switch 350 may receive as many pieces of data as the number of sub-switches 331, 333, 335, . . . included therein.

Assuming that there are N*M slave node switches, and each slave node switch includes K sub-switches, the master node switch 310 may transmit data simultaneously using N*M*K paths. In this case, a general bus network protocol is used for data transmission.

According to an embodiment, the sub-switches 331, 333, 335, . . . shown in FIG. 3 are physical switches functioning as band limit switches. When the first slave node switch 330 includes K sub-switches 331, 333, 335, . . . , data may be received in k different bands at the same time.

Figure 6:
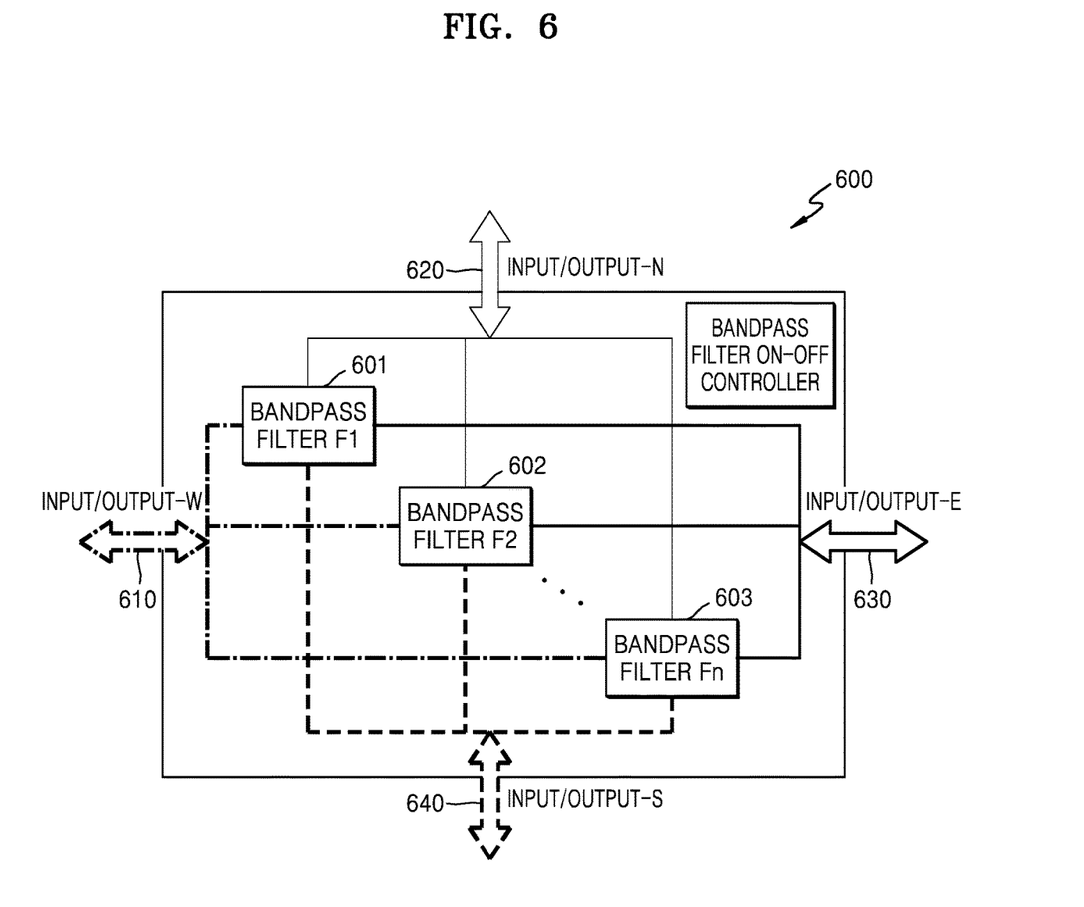
FIG. 6 is a view illustrating an example of sub-switches implemented as band limit switches according to an embodiment.

Referring to FIG. 6, an arbitrary slave node switch 600 may include band limit switches F1 601, F2 602, . . . , and Fn 603. The band limit switches include a band pass filter. The arbitrary slave node switch 600 may be connected to an input/output-W interface 610, an input/output-N interface 620, an input/output-E interface 630, and an input/output-S interface 640.

When first, second, and nth band data signals are simultaneously received through the input/output-E interface 630, the arbitrary slave node switch 600 may simultaneously transmit the first, second, and nth band data signals through the input/output-W interface 610 by using the band limit switch F1 601, the band limit switch F2 602, and the band limit switch Fn 603.

In another embodiment, when a first band signal is received through the input/output-S interface 640 and a second band signal is received through the input/output-N interface 620, the arbitrary slave node switch 600 may receive the first band signal using the band limit switch F1 601 and the second band signal using the band limit switch F2 602. In this case, when the arbitrary slave node switch 600 receives the first band signal and the second band signal, the band limit switch F1 601 and the band limit switch F2 602 are physically turned on, and all the other band limit switches are physically turned off.

Figure 4:
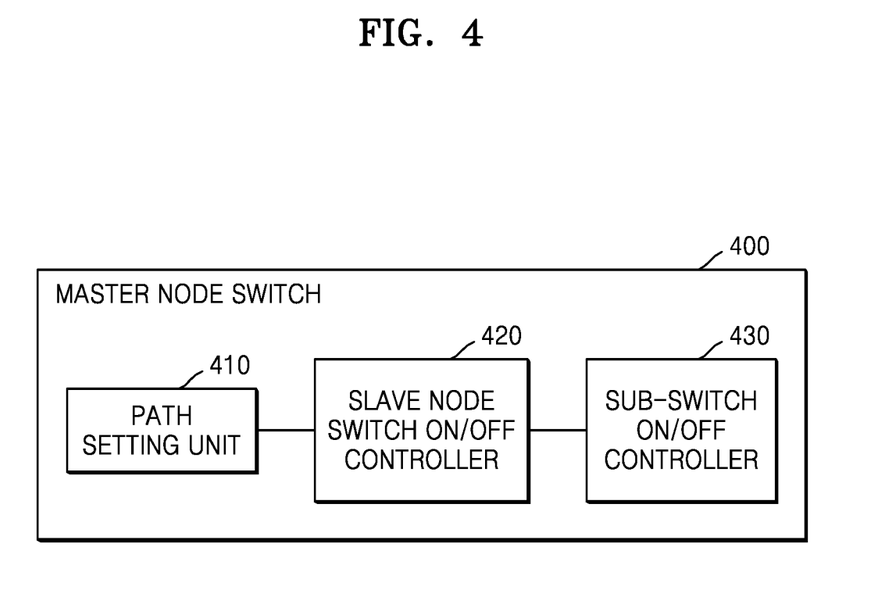
FIG. 4 is a view illustrating an internal structure of a master node switch according to an embodiment.

FIG. 4 is a view illustrating an internal structure of a master node switch 400 according to an embodiment.

The master node switch 400 may include a path setting unit 410, a slave node switch ON/OFF controller 420, and a sub-switch ON/OFF controller 430.

The master node switch 400 may activate the sub-switch ON/OFF controller 430 by referring to a path set by the path setting unit 410 when a plurality of data signals flow into an arbitrary slave node switch.

In addition, when a bypass is required for some data signals because of data transmission/reception collision, the sub-switch ON/OFF controller 430 may be selectively activated.

In an embodiment, the master node switch 400 may determine, based on a path set by the path setting unit 410, whether to activate the slave node switch ON/OFF controller 420 or both the slave node switch ON/OFF controller 420 and the sub-switch ON/OFF controller 430.

When it is confirmed that transmission and reception of a plurality of data signals occur at an arbitrary slave node switch in a path set by the path setting unit 410, both the slave node switch ON/OFF controller 420 and the sub-switch ON/OFF controller 430 are activated.

When all slave node switches in a path set by the path setting unit 410 transceive one data signal, the slave node switch ON/OFF controller 420 may be activated.

In another embodiment, the path setting unit 410 may set a path such that a plurality of slave node switches arranged in an arbitrary row of N rows or an arbitrary column of M columns may be physically turned on at the same time.

Figure 5:
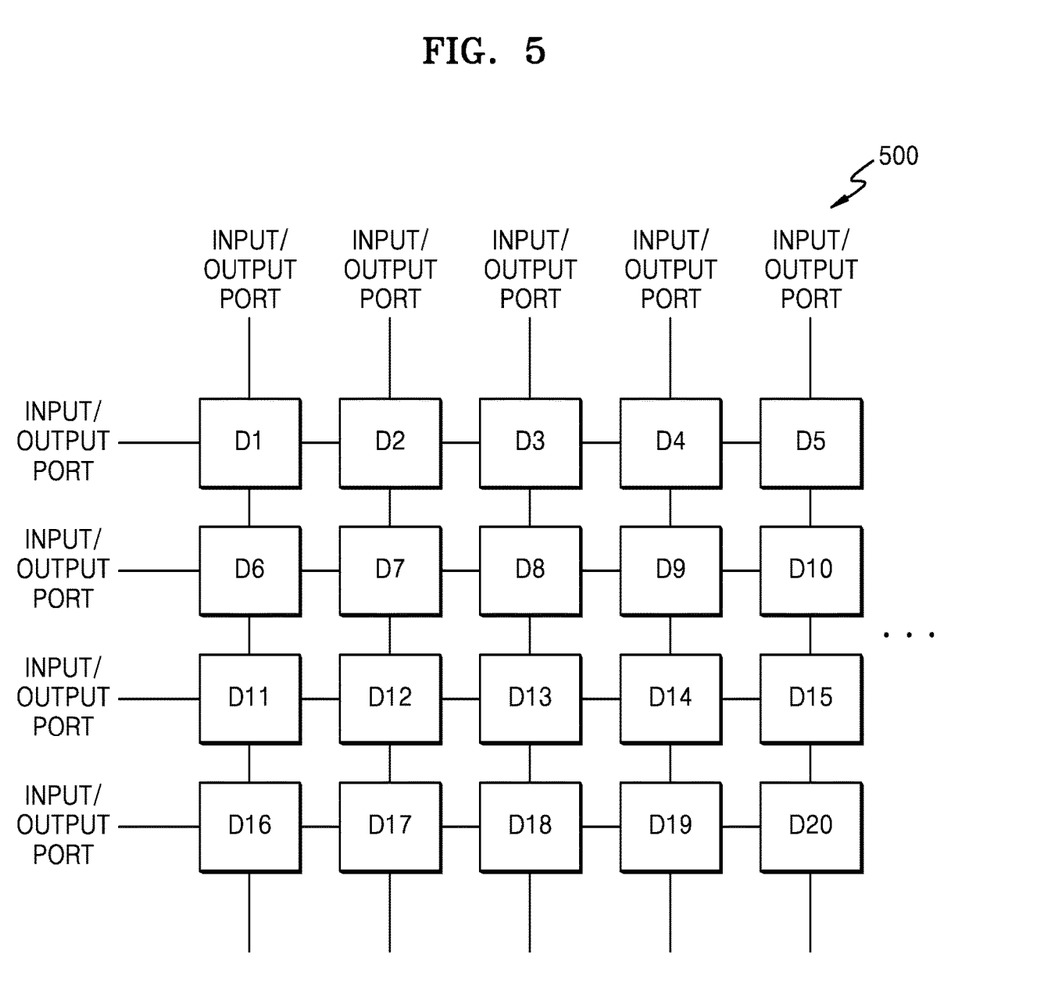
FIG. 5 is a view illustrating an example of arrangement of slave node switches in a bus network system according to an embodiment.

Referring to FIG. 5, for data transmission, the path setting unit 410 may simultaneously turn on slave node switches D1, D2, and D3 arranged in a first row including slave node switches D1, D2, D3, D4, and D5.

The path setting unit 410 may set a path by simultaneously using slave node switches D1, D11, and D16 arranged in a first column including slave node switches D1, D6, D11, and D16. In this case, the master node switch 400 may physically turn on the slave node switches or sub-switches in the path set by the path setting unit 410. In this case, the master node switch 400 may activate the slave node switch ON/OFF controller 420 to simultaneously turn on the slave node switches D1, D11, and D16 and turn off the slave node switch D6.

When the slave node switches D1, D2, and D3 in the first row including the slave node switches D1, D2, D3, D4, and D5 are simultaneously turned on, and the slave node switches D1, D11, and D16 of the first column including the slave node switches D1, D6, D11, and D16 are simultaneously used, the path setting unit 410 may set a path using two sub-switches of the slave node switch D1.

In this case, the master node switch 400 may activate both the slave node switch ON/OFF controller 420 and the sub-switch ON/OFF controller 430 to turn on the slave node switch D1 using the slave node switch ON/OFF controller 420 and selectively turn on a first sub-switch (not shown) and a second sub-switch (not shown) of the slave node switch D1 using the sub-switch ON/OFF controller 430.

Embodiments may be implemented in the form of non-transitory recording media storing instructions executable on computers such as program modules. Non-transitory computer readable media may be any non-transitory media accessible by a computer, such as volatile media, non-volatile media, separable media, or non-separable media. In addition, the non-transitory computer readable media may include computer storage media. Examples of the computer storage media include volatile media, non-volatile media, separable media, and non-separable media that are implemented by any method or technique for storing data such as computer instructions, data structures, or program modules.

Although methods and systems of the present disclosure have been described in connection with specific embodiments, some or all of elements or operations thereof may be implemented using a computer system having a general-purpose hardware architecture.

The description of the present disclosure is for illustrative purposes only, and it will be understood by those of ordinary skill in the art that modifications and changes in form may be made without departing from the technical ideas and essential features of the present disclosure. Therefore, the above-described embodiments should be considered in a descriptive sense only and not for purposes of limitation. For example, each element described above as an individual element may be provided in a distributed manner, and elements described above as being distributed may be provided in a combined form.

As described above, according to the one or more of the embodiments, the bus network system may implement connection between nodes through physical switches and control the connection to reduce inter-network collisions.

Since the bus network system uses physical switches, routers and decoding are not required. In addition, since physical switches are used, a plurality of switches arranged in the same row or column may simultaneously transceive network traffic.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A bus network system for controlling a connection between a plurality of nodes, the bus network system comprising:
    a master node switch; and
    a plurality of slave node switches configured for the connection of the plurality of nodes,
    wherein each of the plurality of slave node switches comprises at least one band limit switch configured to transmit signals in a given band such that each of the plurality of slave node switches is capable of transceiving one or more signals in different bands, and each of the plurality of slave node switches is configured to be physically on/off controlled; and
    wherein the master node switch is configured to control on/off of each of the plurality of slave node switches based on network traffic from an input/output network connected to the plurality of slave node switches and selectively physically turn on the one or more band limit switches included in the turned-on at least one slave node switch based on bandwidth information about the network traffic such that a plurality of different connections between nodes are simultaneously performed.

2. The bus network system of claim 1, wherein the master node switch selectively physically turns on at least one slave node switch in a given path.

3. The bus network system of claim 2, wherein among the at least one band limit switch included in the turned-on at least one slave node switch, a band limit switch configured to transmit signals in the given band is selectively turned on.

4. The bus network system of claim 1, wherein each of the plurality of slave node switches is connected to an input/output port.

5. A bus network system for controlling a connection between a plurality of nodes, the bus network system comprising:
a master node switch; and
a plurality of slave node switches arranged in N rows and M columns for the connection of the plurality of nodes, where N and M are respectively natural numbers,
wherein each of the plurality of slave node switches comprises one or more band limit switches such that each of the plurality of slave node switches is capable of transceiving one or more signals in different bands, and the master node switch controls the plurality of slave node switches and the one or more band limit switches to physically turn on and off the plurality of slave node switches and the one or more band limit switches; and
wherein the master node switch is configured to control on/off of each of the plurality of slave node switches based on network traffic from an input/output network connected to the plurality of slave node switches and selectively physically turn on the one or more band limit switches included in the turned-on at least one slave node switch based on bandwidth information about the network traffic such that a plurality of different connections between nodes are simultaneously performed.

6. The bus network system of claim 5, wherein the plurality of slave node switches are implemented such that a plurality of slave node switches arranged in an arbitrary row of the N rows or an arbitrary column of the M columns are simultaneously physically turned on.

7. The bus network system of claim 6, wherein when at least three slave node switches arranged in an arbitrary row of the N rows or an arbitrary column of the M columns are simultaneously physically turned on, collision therebetween is prevented by using a bus network protocol.

8. A bus network system for controlling a connection between a plurality of nodes, the bus network system comprising:
a master node switch; and
a plurality of slave node switches configured for the connection of the plurality of nodes,
wherein each of the plurality of slave node switches comprises at least one sub-switch configured to transmit signals in a given band such that each of the plurality of slave node switches is capable of transceiving one or more signals in different bands,
each of the plurality of slave node switches is configured to transceive at least one network traffic stream corresponding to the at least one sub-switch, and
wherein the master node switch is configured to control on/off of each of the plurality of slave node switches based on network traffic from an input/output network connected to the plurality of slave node switches and selectively physically turn on the at least one sub-switch included in the turned-on at least one slave node switch based on bandwidth information about the network traffic such that a plurality of different connections between nodes are simultaneously performed.

9. The bus network system of claim 8, wherein when the plurality of slave node switches are arranged in a same column or row and each of the plurality of slave node switches is connected to a plurality of input/output interfaces, each of the plurality of slave node switches is capable of simultaneously receiving a plurality of network traffic streams from the plurality of input/output interfaces.

* * * * *